Jan. 14, 1964    M. L. CECALA    3,117,827
THRUST BEARING
Filed June 1, 1962    2 Sheets-Sheet 1
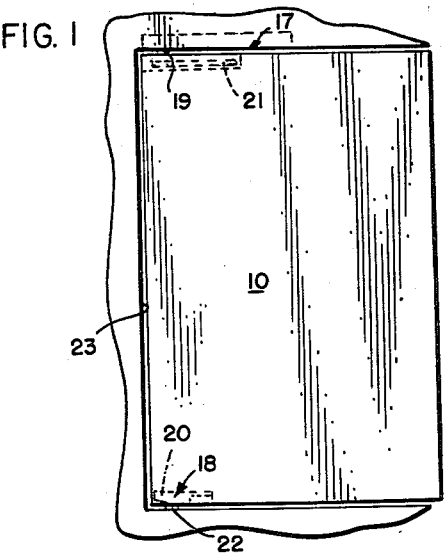
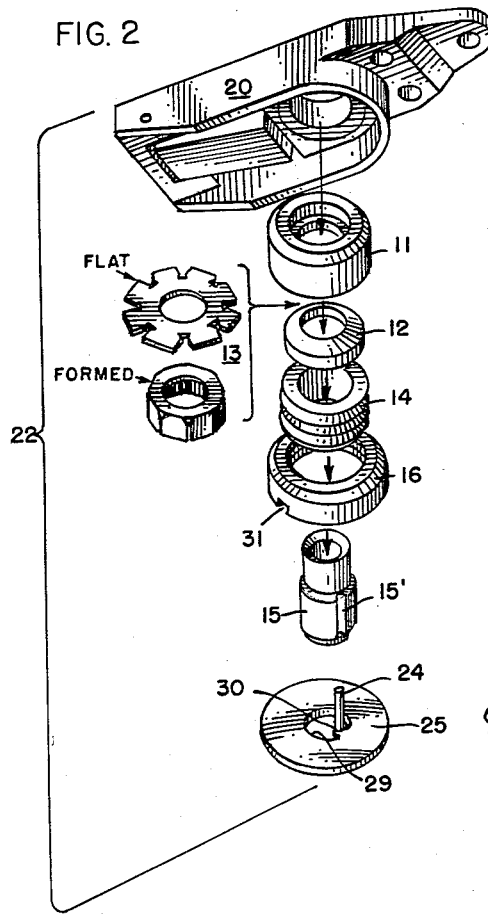
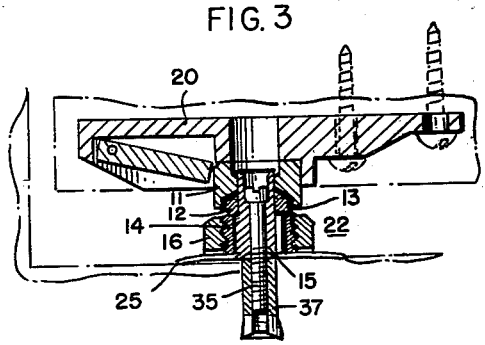
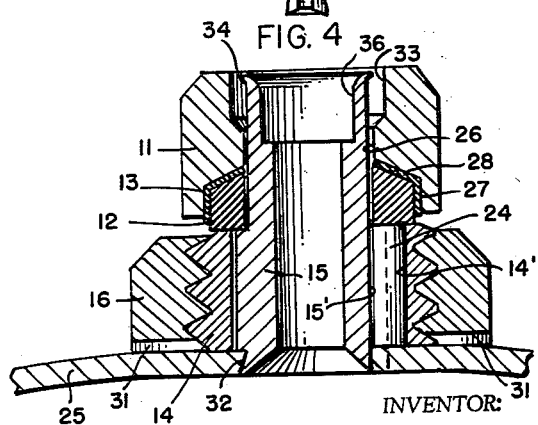
INVENTOR:
MICHAEL L. CECALA
BY
ATT'YS Jan. 14, 1964 M. L. CECALA 3,117,827
THRUST BEARING
Filed June 1, 1962 2 Sheets-Sheet 2

INVENTOR:
MICHAEL L. CECALA
BY
ATT'YS

United States Patent Office 3,117,827
Patented Jan. 14, 1964

3,117,827
THRUST BEARING
Michael L. Cecala, Franklin Park, Ill., assignor to The Oscar C. Rixson Co., Franklin Park, Ill., a corporation of Illinois
Filed June 1, 1962, Ser. No. 199,321
10 Claims. (Cl. 308—161)

This invention relates to thrust bearings and particularly to thrust bearings for the bottom pivotal mounting for swinging doors.

Top and bottom pivoted swinging doors, generally equipped with some form of door-closing mechanism, are supported on top and bottom mountings the pivotal axes of which are vertically alined as close as practical to the jamb of a door-way frame. These top and bottom pivotal mountings comprise co-acting elements that are located, respectively, in or on the door ends and in or on the transom of the door-way frame and in or on the floor. The top mounting element, which is secured to the transom, usually includes a closer mechanism having depending spindle to which is attached an operating arm secured to the upper door end. The bottom mounting element, which is located in or on the floor, includes a thrust bearing on which is rotatively seated a bracket element secured to the bottom door end.

Pivotably mounted doors always have presented a problem of setting the door relative to the door-way in such a manner as to make possible the facile connection of the door on the pivotal mountings. Obviously, the thrust-bearing for the bottom pivotal mounting has to sustain the full weight of the door. Naturally this presents a special problem of minimizing the friction in such a thrust bearing and, often, the need for vertical adjustment to accommodate variations in door frame heights if they occur.

The main objects of this invention are to provide an improved structuring of a thrust bearing for the bottom pivotal mounting for pivoted doors; to provide an improved thrust bearing of this kind which reduces to a minimum the friction created by both the axial and radial thrust caused by the cantilevered weight of the swinging door; to provide an improved thrust bearing of this kind capable of easy axial adjustment to accommodate variations in door heights and eventual bearing wear; to provide an improved thrust bearing assembly and method of forming the same; and to provide an improved thrust bearing of this kind of such simple structure as to make its manufacture very economical and its use and assembly extremely facile.

Specific embodiments of this invention are shown in the accompanying drawings in which;

FIGURE 1 is a front elevational view of a pivotedly mounted door, in closed position, the lower pivotal mounting for which incorporates a thrust bearing constructed in accordance with this invention;

FIG. 2 is an exploded view of one form of thrust bearing, for such a door, constructed in accordance with this invention and illustrating the bearing elements in association with one form of bracket element for anchoring the door to the thrust bearing;

FIG. 3 is a vertical sectional view of the assembled thrust bearing and bracket element shown in FIG. 2;

FIG. 4 is an enlarged, vertical sectional view of the assembled thrust bearing of FIGS. 2 and 3;

Figure 5:
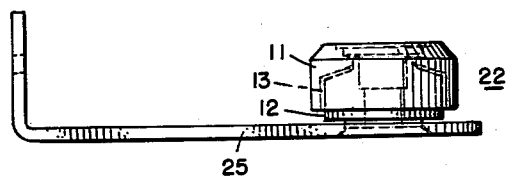
FIG. 5 is a side, elevational view of another form of thrust bearing constructed in accordance with this invention and including one form of floor plate for mounting the bearing.
Figure 6:
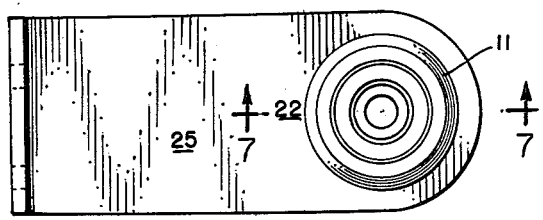
FIG. 6 is a plan view of the same.
Figure 7:
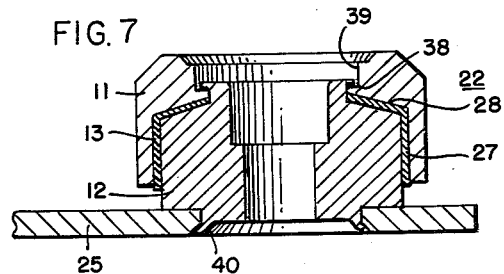
FIG. 7 is an enlarged, vertical, sectional view of the thrust bearing per se as taken on the line 7—7 of FIG. 6.
Figure 8:
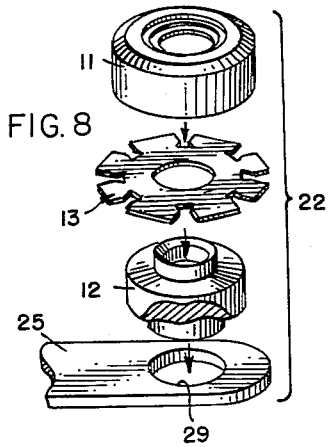
FIG. 8 is an exploded view of thrust bearing of FIG. 7.

The essential concept of this invention is to provide a simplified, low cost, thrust bearing assembly comprising a pair of telescopically-arranged annular race members having both axial and radial coacting bearing surfaces and an interposed anti-friction element fashioned from a single disc of anti-friction material, the assembly being made by merely stacking the thrust bearing elements in proper axial order and then forcing them together axially as in a staking press.

A thrust bearing, for use with a pivotedly hung door 10, embodying the foregoing concept comprises a pair of upper and lower race members 11 and 12 between which is interposed a composition anti-friction element 13. In one instance this thrust bearing has the inner or lower member 12 mounted on a screw element 14 which is axially keyed to and slidable on a supporting post or stud 15 and embraced by a nut 16 to effect axial adjustment of the screw and the nested members 11 and 12 along the post 15 and relative to a base plate 25. In another instance the improved bearing has the inner member 12 simply fixed to the base plate 25, as by a staking operation. In either case the inner member 12 is the stationary element of the bearing and axially supports the upper or outer member 11 which is the rotating element; and both radial and axial forces on the bearing are transmitted through the anti-friction element 13.

A conventionally-hung door 10, such as shown in FIG. 1, is hinged on pivotal mountings 17 and 18, indicated in dotted outlines. Generally, the upper pivotal mounting 17 is part of a door-closing mechanism which includes a spindle 19 to which is attached an operating arm 21 on the door 10. The lower pivotal mounting 18 generally is a two-piece structure with a thrust bearing 22 for positioning on or in the floor, and some form of bracket element 20 for fixing on the door and provided with a thrust-bearing seat. The spindle 19 and the thrust bearing 22 are vertically alined usually closely adjacent to the door-way jamb 23. Obviously, the thrust bearing 22, whatever its structure, bears the entire weight of the door 10. Such a mounting for doors 10 presents the major problem of facile positioning of the door on these alined pivotal mountings and securing a minimum of friction between the relatively-rotating parts of the thrust bearing to minimize wear and insure free and easy swinging of the door.

In the form shown in FIGS. 2 to 4, the inner race 12 is an annular member having a flat bottom end and a conical upper end. This element 12 is mounted for axial movement along a fixed post or stud 15 which is secured to the base plate 25, the member 12 having a central bore to receive the stud and being carried on the upper end of a hollow, externally threaded, screw member 14 which is likewise slidably fitted on the stud 15. The screw 14 is held against rotation relative to the stud 15 by means of an axially extending key 24 which fits in a groove 15' in the external sidewall of the stud and which also is slidably engaged in an axial groove 14' in the internal wall of the screw element 14.

Axial movement of the screw element 14, and hence axial adjustment of the thrust bearing races 11 and 12, relative to the base plate 25, is obtained by means of the nut 16 which is threaded onto the screw 14 and bears upon the base plate. Thus rotation of the nut 16 causes axial adjustment of the screw relative to the base and, with it, axial adjustment of the height of the bearing elements 11 and 12 above the base.

As shown, the upper bearing race 11 is an annular member having an axial bore 26 of a size to slidably receive the stud 15. Also the member 11 is counterbored from each end. The counterbore 27, on the bottom side of the member 11, is made of a size to telescopingly receive and substantially enclose the lower race member 12 and terminates at its inner end in a conically tapered seat 28 that is complemental to the tapered upper end of the lower race 12. The sides of the counterbore 27 and inner race member 12 are cylindrical and axially parallel; and preferably the inner race member is keyed endwise on the screw member 14, by radial interfitting key means not shown, so as to be fixed against rotation relative to the screw member and the base 25.

Figure 9:
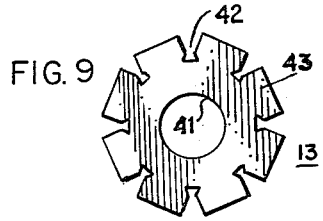
FIG. 9 is a plan view of the anti-friction element of the improved thrust bearing assembly.

The anti-friction element 13 is a comparatively thin disc of an anti-friction composition commonly known as "Teflon." This element 13 is stamped from the material in sheet form and is made of a diameter equal to the combined length of the surfaces 27 and 28 in the upper member 11. The stamping has a central opening 41 of a size to receive the stud 15, and the perimeter of the element 13 has notches 42 formed therein to provide a series of tongues 43 (FIGS. 2 and 9) which, when the bearing elements are assembled, become disposed axially of the element 13 and interposed between the radially opposed surfaces of the nested members 11 and 12. At this point it will be understood that the counterbore 27 in the race member 11 will be sufficiently greater than the diameter of the member 12 to permit the member 13 being disposed therebetween.

The element 13 is converted from a flat disc form into an operative cup-shaped form simply by the laying of the disc on the tapered end surface of the inner member 12 and then forcing the outer member 11 down into nested position over the member 12, the sidewalls of the member 11 turning the tongues 43 so that they embrace the sides of the inner member. Thus when the bearing is put into operative use the opposing radial surfaces and the opposing axial surfaces of the nested members 11 and 12 will have an efficient anti-friction means disposed between them and the assembly will be able to sustain the combined thrust and radial load occasioned by the normal operation of the swinging door.

It will be understood that in forming the element 13, the notches 42 will extend radially inward from the periphery of the element to a point that will be substantially the same distance from the center as the circumference of the inner race 12; and the tongues 43 will be of such width that when turned to the axially parallel position they will be side by side and not overlap.

The supporting plate 25 shown in FIGS. 2 to 4 is an annular disc, of an inverted dished form, having a central hole 29 to seat the post 15 which is staked therein. As shown in FIG. 2 the periphery of the opening 29 is formed with an inwardly projecting tab 30 of a size to fit into the groove 15' of the stud or post 15. This tab provides a bottom rest for the key pin 24 and prevents it from dropping out of the assembly.

The nut 16 preferably is circular, as shown in FIG. 2, embracing the threaded exterior of the screw part 14. The nut 16 sets directly on the base plate 25 so that rotation of the nut 16 causes an axial shifting of the screw 14 and hence the nested members 11 and 12 on the post 15. Notches 31, on the under face of the nut 16, permit the insertion of a tool, such as the end of a screwdriver, to facilitate the turning of the nut 16 after the door has been set in place on the thrust bearing 22.

As shown in FIG. 4 the post 15 has its lower end peened over or staked into the hole 29 in the plate 25, as shown at 32, to secure the bearing assembly thereto. Above the nut 16 the post 15 is of reduced diameter to fit in the bores of the nested members 11 and 12. The over-all length of the post 15 is such as to extend some distance above the inner end of the counterbore 33 of the outer member 11 and, as shown, the upper extremity of the post 15 is peened over as at 34 to provide a rim for engaging the outwardly facing shoulder at the end of the bore 26 and securing the members 11 and 12 against removal from the post and to maintain the bearing assembly.

The inverted dished-shape base plate 25 serves to grip the floor surface, when the bearing assembly is installed, to prevent unwanted rotation of the post and base plate during adjustment of bearing height and during normal swinging operation of the door. This form of the improved thrust bearing is installed by bolting the assembly into an anchor socket 37 previously set into the floor, the bolt 35 being inserted through the open top of the stud or post 15 and bearing against an internal shoulder of the post, formed by a counterbore 36 therein, to clamp the post and the base plate 25 tightly against the floor surface, as shown in FIG. 3. Thus the peripheral edge of the base plate, which may be formed with a downward burr, is forced to bite into the floor surface and hold the plate from turning.

The bracket element 20, shown in FIGS. 2 and 3, is one of several possible structures suitable for use with this type of thrust bearing 22. The form of bracket element 20 herein shown is also shown and described in my copending application Serial No. 199,507, filed June 1, 1962.

In the thrust bearing 22, structured as shown in FIGS. 5–8, the inner member 12 is a plain cylindrical body having a short neck of reduced diameter on its under side which is fixed to the plate 25, which is there shown as an angle bracket, by the peened-over rim 40. The outer member 11, in this adaptation, is of the same general form but of less height than the member 11 of the adaptation shown in FIGS. 2–4. The member 11, in this FIGS. 5–8 adaptation, is retained in rotative relation on the inner member 12 by the peened-over rim 38 on the upper end of the member 12 above an internal shoulder formed by a counterbore 39 in the member 11.

The anti-friction element 13, for the adaptation of FIGS. 5–8, is formed and functions precisely the same as hereinbefore described for the first adaptation of this invention.

Although either of the forms of thrust bearing 22, herein shown, may be used with either of the forms of bracket elements shown and described in the above-identified copending application, the bracket element 20, as shown in the instant FIGS. 2 and 3, is preferred for use with the adjustable thrust bearing herein disclosed. Whatever the form of bracket element used it will be apparent, from FIG. 4, that the turning of the nut 16 shifts the members 11 and 12, in their nested relationship, axially along the post 15. Thus it is possible with such a form of thrust bearing 22 to make a very accurate positioning of a door 10 in the door-way to insure the best functioning of the upper pivotal mounting 17 for a door in its swinging between closed and open position. The non-adjustable thrust bearing of FIGS. 5 to 8 hereof is of general utility and may be used with any suitable pivot bracket structure.

The main advantages of this invention reside in the simplicity of the improved thrust bearing structure, the facility of its assembly, and the resultant low cost of its manufacture. Other advantages are to be found in the simple and low cost arrangement of the anti-friction means whereby both axial and radial loads are accommodated simultaneously; in the fact that the improved thrust bearing is adaptable to substantially any type of mounting means; and in the fact that the assembled thrust bearing is a substantially permanent, self-sustaining, structure which requires no lubrication or maintenance for a long and quiet operational life.

Although two specific embodiments of this invention have been herein shown and described it will be understood that details of the structures shown may be altered or omitted without departing from the spirit of the invention as defined by the following claims.

I claim:

1. A thrust bearing for the bottom pivotal mounting of a swinging door comprising, (a) a supporting plate,
(b) an annular inner bearing member mounted on the plate and extending upwardly therefrom to terminate in an axially upward facing bearing surface,
(c) an outer bearing member axially mounted on the inner member and having an annular axially recessed bearing surface telescopingly embracing the upper end of the inner member, said recessed bearing surface having a cylindrical portion radially opposing the periphery of said inner member and an axially facing portion opposing the axially facing bearing surface of said inner member, and
(d) a cup-shaped element of anti-friction material interposed between the radially and axially opposing surfaces of the two members.

2. A thrust bearing as set forth in claim 1 wherein the opposed axial faces of the two bearing members are conical surfaces tapered upwardly from the support plate and the interposed cup-shaped element is formed from a flat peripherally-notched disc of anti-friction material molded over the inner member by the telescoping assembly of the outer member thereon.

3. A thrust bearing as set forth in claim 1 wherein both members are of annular form, the outer member has an axial bore centrally therethrough and an axially upwardly facing shoulder surrounding said bore, and the inner member has a concentric part of reduced diameter extending upwardly through the bore in the outer member, the outer end of said reduced diameter part being flared radially outward for axially engaging the upwardly facing shoulder surrounding the outer member bore to retain the outer member against separation from the inner member.

4. A thrust bearing as defined by claim 1 wherein the outer member has an axial bore extending therethrough and an axially upwardly facing shoulder surrounding said bore, the inner member has a concentric part of reduced diameter extending through the bore of the outer member and flared at its outer end for engaging the said shoulder of the outer member, the inner member has a bore extending axially therethrough, and the support plate has an opening therethrough alined with the bore of the inner member.

5. A thrust bearing for the bottom pivotal mounting of a swinging door comprising,
(a) a supporting plate,
(b) a post fixed on the plate, and extending upwardly therefrom,
(c) a hollow externally-threaded screw slidably mounted on the post and keyed against rotation relative thereto,
(d) a nut rotatably threaded on said screw and normally bearing against said support plate for shifting said screw axially on said post,
(e) an annular inner bearing element on the upper end of said screw and having an axially upward facing bearing surface,
(f) an outer bearing element having a cup-shaped recess in its bottom end for telescopingly receiving and rotatively embracing said inner bearing element, said recess having a cylindrical portion radially opposing the periphery of said inner member and a shoulder portion axially opposing the upwardly facing bearing surface of said inner member, and
(g) a cup-shaped element of anti-friction material interposed between the opposed radially and axially opposing surfaces of the said inner and outer bearing elements.

6. A thrust bearing as set forth in claim 5 wherein the opposed axial faces of the two bearing elements are conical surfaces tapered upwardly from the supporting plate, and the interposed cup-shaped anti-friction element is formed from a peripherally-notched disc of anti-friction material molded over the end and side surfaces of the inner bearing element by the telescoping assembly of the outer bearing element thereon.

7. A thrust bearing as defined in claim 5 wherein each of the bearing elements has a central bore extending axially therethrough, the outer bearing element has an upwardly facing shoulder surrounding said bore, the post has a central part extending upwardly through the bores of the two bearing elements, and the upper end of the post is flared radially outward for engaging the upwardly facing shoulder surrounding the outer element bore to retain the outer element on said post.

8. A thrust bearing as defined by claim 7 wherein the post is mounted in an aperture in the supporting plate, the post is hollow from end to end, and the post is counterbored from its outer end to provide an upwardly facing internal shoulder to seat the head of a bolt inserted through the post from its outward end.

9. A thrust bearing as defined by claim 8 wherein the supporting plate is dished on the face thereof opposite said post.

10. A thrust bearing as defined by claim 8 wherein the supporting plate is an annular disc and has its face opposite said post concavedly dished.

References Cited in the file of this patent

UNITED STATES PATENTS

| | | |
|---|---|---|
| 1,341,690 | Werner | June 1, 1920 |
| 1,761,943 | Summers et al. | June 3, 1930 |
| 2,674,767 | Fairhurst | Apr. 13, 1954 |
| 2,987,755 | Ferguson | June 13, 1961 |
| 3,039,786 | Punches | June 19, 1962 |